United States Patent [19]

Shaddock

[11] 3,884,528

[45] May 20, 1975

[54] UNLOADING APPARATUS

[75] Inventor: Roland E. Shaddock, Streator, Ill.

[73] Assignee: Myers-Sherman Company, Streator, Ill.

[22] Filed: Mar. 8, 1973

[21] Appl. No.: 339,060

[52] U.S. Cl. ......... 302/58; 137/355.16; 137/355.24; 137/615; 141/279; 141/388; 214/14; 302/64
[51] Int. Cl. ............................................ B65g 53/54
[58] Field of Search ..... 137/355.16, 355.24, 355.26, 137/355.28, 615; 141/279, 284, 387, 388; 193/16–21, 25 R, 25 C; 214/14; 302/58, 64, 40

[56] References Cited
UNITED STATES PATENTS

| | | | |
|---|---|---|---|
| 630,740 | 8/1899 | Rawe | 137/355.18 X |
| 1,385,870 | 7/1921 | Gieseler | 302/58 X |
| 3,439,700 | 4/1969 | Preston | 137/615 X |
| 3,459,222 | 8/1969 | McElroy | 137/615 |
| 3,572,380 | 3/1971 | Jackson et al. | 137/615 X |
| 3,608,577 | 9/1971 | Blanchard | 137/615 X |
| 3,685,543 | 8/1972 | Schwing et al. | 137/615 |
| 3,707,990 | 1/1973 | Schaible et al. | 137/615 |

FOREIGN PATENTS OR APPLICATIONS

| | | | |
|---|---|---|---|
| 1,137,388 | 9/1962 | Germany | 141/388 |

*Primary Examiner*—Evon C. Blunk
*Assistant Examiner*—W. Scott Carson
*Attorney, Agent, or Firm*—Hill, Gross, Simpson, Van Santen, Steadman, Chiara & Simpson

[57] ABSTRACT

A pneumatic conveying device, especially well-suited for unloading granular materials from barges, including a fixed length flexible suction hose supported by an extensible boom for adjustable positioning over a broad area of a loaded barge. The boom supports a downstream portion of the hose in a generally horizontal position above the barge with an upstream portion of the hose extending downward from an end of the boom into a conveying posture relative to the load. The boom end further provides a suitable support around the hose bend at the transitional area between the horizontal and downward extending hose portions. In extending and retracting the boom, to reach all material to be unloaded, a greater or lesser portion of the flexible hose is supported by the boom and the bend location of the hose will migrate back and forth over a considerable portion of the hose in routine unloading operation.

12 Claims, 8 Drawing Figures

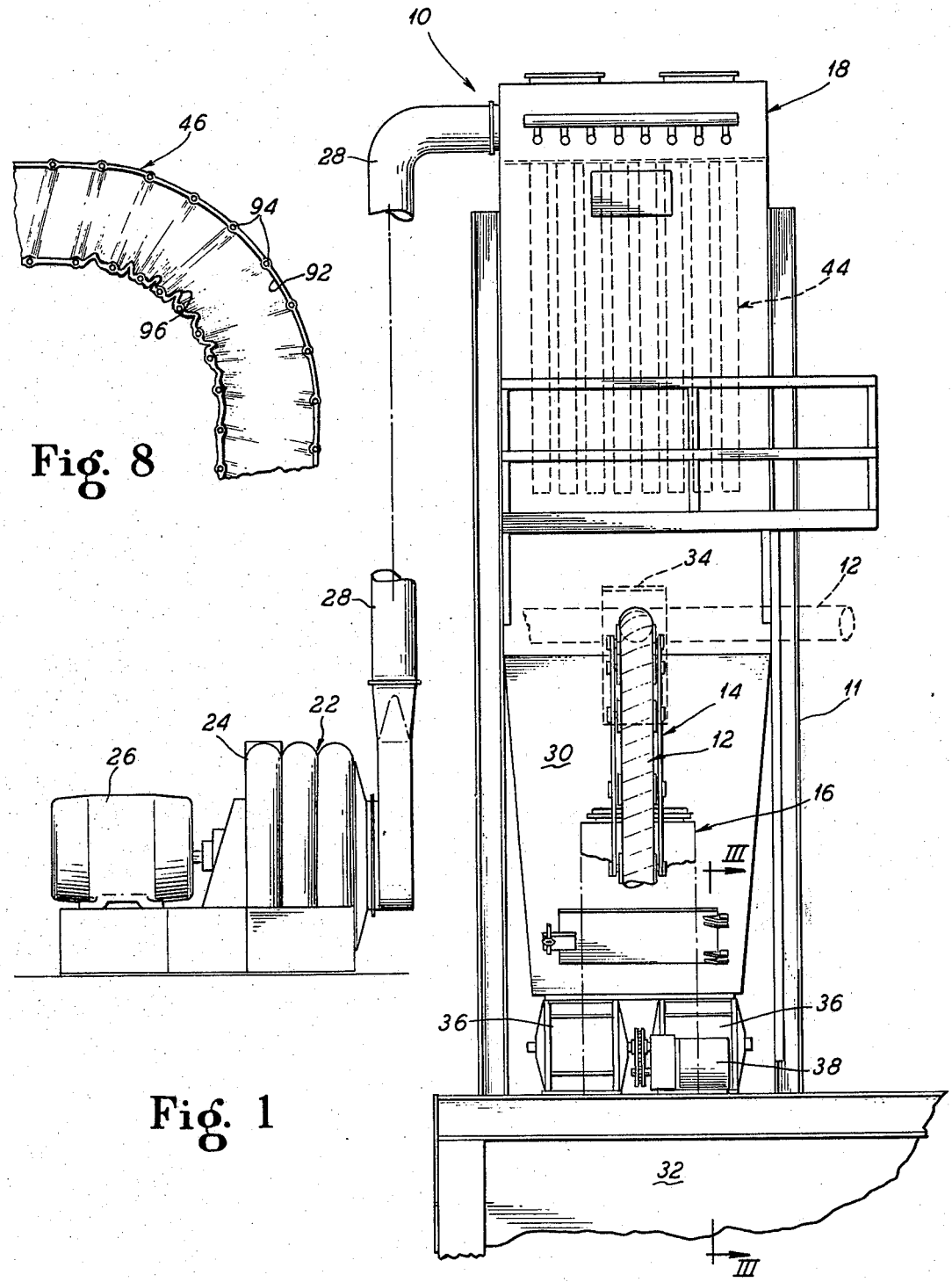

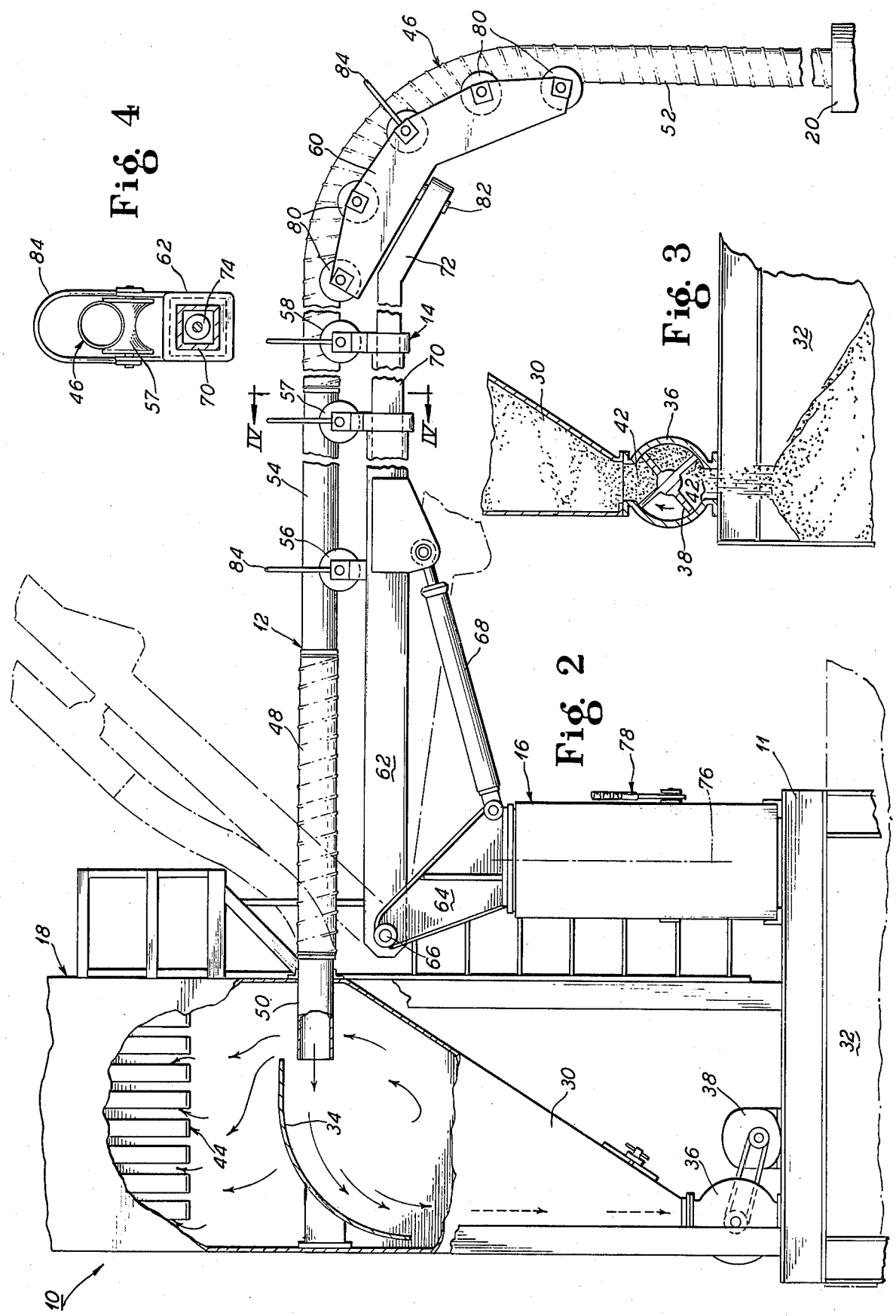

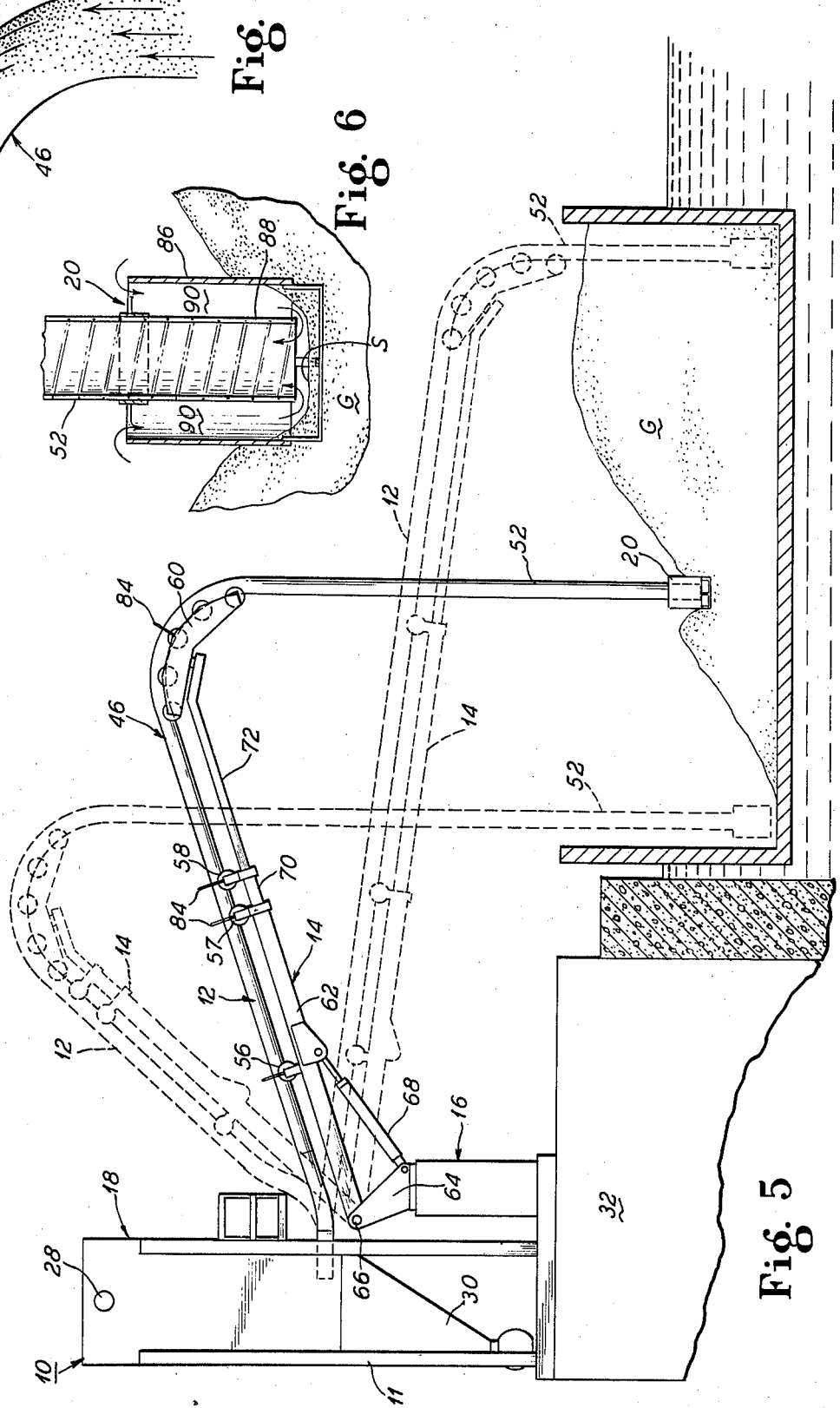
Fig. 5
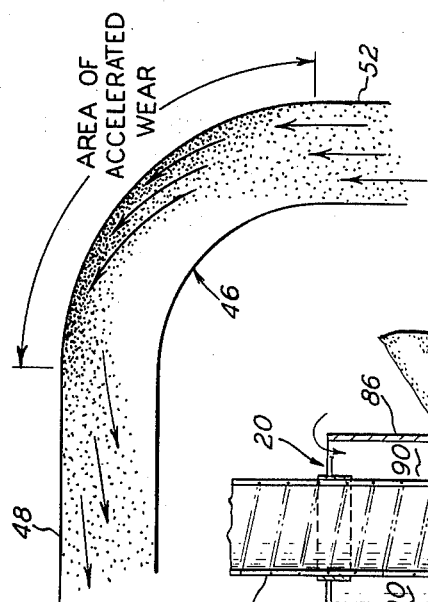
Fig. 6
Fig. 7
AREA OF ACCELERATED WEAR

UNLOADING APPARATUS

BACKGROUND OF THE INVENTION

The economy of shipping bulk materials, such as grain, by barge has long been recognized and much has been done to improve the handling of such materials at water-front terminals. High rates of loading and unloading barges are now common, however, costs and efficiency in unloading barges are less attractive than with loading them. At present, the most effective method to unload grain from a barge for storage in water-front elevators is with the use of a "suction unloader".

While initial cost of installations are relatively large, as is the power requirement, the labor savings are considerable and material is elevated and conveyed in one operation, and dust can be separated at the same time. While a barge can be emptied in a few minutes by this method, there are various problems with the presently employed apparatus which this invention effectively overcomes.

One form of suction unloader currently in use provides a suction conduit consisting of telescoping metal pipe sections having slip joints between sections to provide a bare minimum flexibility needed to maintain the intake end of the suction conduit in communication with the material to be unloaded. Slip joints permit air leakage, especially with wear and deformities of the conduit associated with hard use, resulting in reduced efficiency and increased costs. Earlier types of unloaders required bolting on additional lengths of pipe to extend the reach of the suction conduit intake and thereby sacrificing much of the labor saving associated with the suction unloader. Further, considerable hand shoveling is still required with these unloaders to empty a barge. Another form of suction unloader, utilizes a flexible hose elbow to join generally rigid horizontally and vertically extending pipe portions of the suction conduit. With this apparatus, one end of the horizontal pipe portions is pivotably connected to a receiving chamber and supported from above by a hoist, or the like, in order to lower the vertical extending pipe portion to keep it submerged in the grain in an unloading position. Here too, much hand shoveling is required to empty grain from the sides of a barge. Further, the scouring action of the conveyed grain around the bend of the flexible elbow soon wears out this section of the conduit, often in a matter of a few weeks.

While this apparatus is more efficient than the apparatus utilizing slip joints, considerable more maintenance and "down time" is experienced therewith. Accordingly, it would be an advance in the art to provide a "suction unloader" having maximum efficiency, reduced maintenance and elimination of all or much of the hand shoveling associated with the prior art.

SUMMARY

My invention is directed to a pneumatic conveying apparatus utilizing a vacuum or suction system to remove grain, and the like, from barges for storage in dockside grain elevators. This system includes a generally flexible suction hose having a suction nozzle at its upstream end and an air/grain separating chamber at its downstream end. The flexible suction hose is adjustably positioned to unload grain from the barge by an extensible boom which supports a downstream portion of the hose generally horizontal above the loaded barge, with an upstream portion extending vertically downward from the end of extensible boom, about a bend, into unloading contact with the grain. As grain is removed from one area of the barge, the boom is swung longitudinally and extended laterally of the barge to reach more remote areas. A plurality of these units may be positioned along a barge dock to simultaneously unload a large barge or conversely, a single unit may be employed to unload a smaller barge or a large barge, with the larger barge repositioned during unloading.

In extending or retracting the boom, a greater or lesser portion of the flexible hose is supported, and the bend in the hose, around the end of the boom, joining the horizontal and vertical hose portions, will move along the hose relative to the location of the boom end. Since a bend in the hose is inherently an area of accelerated wear, due to the scouring effect of the grain impinging on the outside radius of the inner hose wall, and because the bend in the hose is caused to shift back and forth along a considerable portion of the hose during operation, useful life of the flexible hose is greatly extended over prior designs in which the bend location is fixed.

It is, therefore, a principal advantage of this invention to provide a pneumatic conveying device, especially suited to unload granular material from barges, requiring minimum hand labor or maintenance and providing maximum efficiency and production.

Another advantage of this invention provides a versatile suction unloading apparatus for grain, having an air flow nozzle with suitable controls to maintain the nozzle in conveying posture, whereby the nozzle is lowered into contact with the grain, extended across the width of a barge and is swung lengthwise of the barge, to gain access to a broad area of the barge to facilitate unloading.

Still another advantage resides in the employment of a flexible hose for barge unloading, in which the area of inherent accelerated hose wear is caused to migrate back and forth along a substantial portion of its length in the normal barge unloading operation.

Other features and advantages of the invention will be readily apparent from the following description of a preferred embodiment thereof, taken in conjunction with the accompanying drawings, although variations and modifications may be effected without departing from the spirit and scope of the novel concepts of the disclosure.

DESCRIPTION OF THE DRAWINGS

FIG. 1 is a side elevational view of a pneumatic conveying device constructed in accordance with the principles of the present invention;

FIG. 2 is an enlarged side elevational view, partially in section, taken along the line II—II of FIG. 1;

FIG. 3 is a partial section view taken along the line III—III of FIG. 1 and showing details of the air lock;

FIG. 4 is a fragmentary sectional view of the flexible hose and the extensible boom support therefor, taken along the line IV—IV of FIG. 2;

FIG. 5 is a view similar to FIG. 2, at a reduced scale and showing the pneumatic conveying device in a barge unloading operation;

FIG. 6 is a sectional view of the suction nozzle in an operable position;

FIG. 7 is a diagrammatical sectional view of the flexible base, at a bend therein and showing the material flow therethrough; and FIG. 8, on page 1 of the drawings, is a sectional view of the flexible hose at the bend, showing details of construction.

DETAILED DESCRIPTION OF THE INVENTION

In the preferred embodiment of the invention, as shown in FIG. 1, I show a pneumatic conveying apparatus 10 mounted on a frame 11 at a barge unloading terminal. The conveying apparatus 10 includes a conduit 12 supported along a portion of its length on an extensible boom 14 of a crane 16 and having one end thereof connected to a separating chamber 18 and having a second end terminating in a nozzle 20.

An air flow inducer 22, comprising an air compressor or fan 24, driven by a suitable power source 26, is connected to separating chamber 18 by a conduit 28 whereby an air flow is developed in the system to suck air into the nozzle at a comparatively high velocity, wherein grain or other suitable material to be conveyed becomes entrained or mixed with the air current and is conveyed along the conduit 12 by the air current. Upon passing through the conduit 12 and into the large separating chamber 18, the air velocity diminishes and the grain falls to a bottom collection area 30 of the separating chamber 18 for delivery to a hopper 32 enroute to a grain elevator or other destination. A deflector 34 is provided in the path of the oncoming stream to curve the grain downward to further encourage material and air separation and to reduce turbulence and damage to the grain.

As shown in FIGS. 1 and 2, a pair of rotary air lock valves 36, 36, driven by a motor 38, passes the grain from the collection area 30 into the hopper 32 without a large reverse air flow. The valves 36 include a rotor 40, as best illustrated in FIG. 3, which defines a plurality of pockets 42 within the valves 36. One pocket 42 receives grain from the collection area 30 while another pocket 42 discharges grain into the hopper 32.

While the grain is diverted downward into the collection area 30 of the separating chamber 18, by the reduced air velocity and the deflector 34, the air flow moves upward into the conduit 28, being evacuated from the separating chamber 18 by the air flow inducer 22. However, before the air with lightweight dust particles still entrained therein leaves the separating chamber 18, the air must first pass through a filter system 44 which removes the dust and passes the clean air on to the compressor or suction pump 26 by way of conduit 28, out into the atmosphere. The filter system 44 may be any suitable type, as for example, the bag house air filter system described in my pending U.S. Application Ser. No. 297,408, filed Nov. 13, 1972, on "Air-Filter Systems For Debris Collecting Apparatus".

With specific reference to FIGS. 2 and 5, it will be seen that the conduit 12 comprises a generally flexible hose means 46, having a downstream portion 48 connected to an inlet tube 50 of the material/air separating chamber 18, and supported generally in a horizontal attitude upon the extensible boom 14 of crane 16; and an upstream portion 52 depending vertically downward around the end of boom 14 and terminating with the suction nozzle 20. In the embodiment illustrated, the flexible hose means 46 comprises a rubber-like, spiral wire reinforced vacuum hose having a length of rigid tube 54 interposed between flexible lengths of the downstream portion 48, at a location where no bending is required. This has been done primarily for the sake of economy, however; the hose means 46 may be constructed in one continuous flexible length, if desired.

The extensible boom 14 includes a hollow boom member 62 pivotably mounted to a swingable pivot frame 64 of crane 16 by means of a shaft 66 for vertical adjustment thereof. A control means 78 provides the fluid control to extend or retract a cylinder 68, supporting the elevatable end of boom 14. The boom 14 further includes a first hollow telescoping member 70 extensibly mounted within said hollow boom member 62; and a second telescoping member 72 extensibly mounted within said first hollow telescoping member 70. The telescoping members 70 and 72 are extended by a fluid cylinder means 74 operably situated within the hollow members 62 and 70 as best seen in FIG. 4, and extended or retracted by control means 78.

Control means 78 also regulates the swing of the pivot frame 64 about the axis 76 of crane 16. Thus, the extensible boom 14 may be located in a wide range of positions by the operation of control means 78.

The downstream portion 48 of flexible hose 46 is supported and guided along the length of extensible boom 14, on contoured rollers 56, 57 and 58 and by a bend support assembly 60 around the end of the boom. Roller 57 is mounted to the end of hollow boom member 62 at the top thereof and remote from the pivot shaft 66, and roller 56 is mounted on the top of hollow boom member 62 intermediate roller 57 and inlet tube 50 of the separating chamber 18. The roller 58 is secured to the end of telescoping member 70 and is extensible therewith, and support assembly 60 is secured to the end of telescoping member 72 and is extensible therewith. The support assembly 60 includes five contoured rollers 80 arranged to provide rolling support and guidance for the flexible hose 46 around a bend at the transitional area between the upstream and downstream portions of the hose 46. The rollers 80 are positioned to provide a suitable radius about which the hose will bend. The support assembly 60 is mounted to the telescoping member 72 by means of a pivotable subshaft 82 to provide a limited degree of horizontal movement of the depending hose upstream portion 52 without being unseated from the roller 80. Further, a plurality of hoop-shaped rods 84, as best seen in FIG. 4, are also provided to retain the hose on the contoured rollers.

Now with reference to FIG. 6, it may be seen that the nozzle 20 comprises a drum or cylindrical sleeve 86 supported on and spaced coaxially outwardly from the intake end 88 of the upstream portion 52 of flexible hose means 46 to provide an air passageway 90 between the sleeve 86 and the hose intake end 88. In operation, air is sucked into the nozzle 20 by way of the air passageway 90, across the surface S of the grain G and upward into the hose intake end 88, at a sufficient velocity whereby grain becomes entrained in the air and is conveyed therewith through the flexible hose means 46, around the bend and into the separating chamber 18.

FIG. 7 shows in diagrammatic form the flow of grain through the flexible hose 46 around the bend therein. The degree of bend in the hose is of course dependent upon the elevational level of the boom 14. The hose is required to assume a maximum bend of considerably more than 90 degrees, as best shown in FIG. 5 in broken lines at the left, wherein the boom 14 is elevated to its maximum and assumes a minimum bend of slightly less than 90 degrees, also shown in broken lines in FIG. 5 at the right, wherein the boom is in its lowermost position.

As grain moves with the stream of air into the bend area from the straight upstream portion 52 of the flexible hose means 46, it is generally evenly distributed in the air stream throughout the hose diameter, having a tendency to move along with minimum contact with the hose wall because of the slightly higher velocity toward the center of the conduit, in accordance with well-known hydrodynamic principles.

In negotiating the hose bend, however, inertial forces cause the grain to impinge on the outside radius hose wall 92 producing an area of accelerated wear. To minimize the scouring effect, and limit turbulence, the hose bend is maintained at a fixed optimum radius, consistent with the hose diameter and specific application. Upon leaving the hose bend area, the grain again becomes evenly suspended in the air stream, moving along the downstream hose portion 48.

Now with reference to FIG. 8, the flexible hose means 46 is shown constructed of rubber-like side walls with a spiral wire reinforcement 94 embedded in the hose wall, which permits the hose to deform axially around the bend along the walls' inside radius 96, but maintaining the hose walls' outside radius 92, taught and free of fold deformities. Thus, the grain in moving along the outside radius, follows a relatively unobstructed "chute" around the bend. Further, the spiral wire reinforcement 94 provides diametral rigidity to maintain a generally uniform hose cross section along its entire length.

It will now become obvious from the foregoing, that as the extensible boom 14 is retracted or extended to reach all areas of the barge, the bend in the flexible hose 46 will migrate along a considerable length thereof, and when elevated or lowered, the hose is caused to bend to a greater or lesser extent around the support assembly 60. Thus, it will be seen that concurrently with changing the location of the suction nozzle 20, a variation in the hose bend location and configuration will be brought about. Since in pneumatic conveying, bend areas in the conduit are subjected to accelerated wear, the constantly shifting bend area as provided in the present invention achieves a much longer life in the flexible hose and greatly diminishes the "down time" related to hose repairs and change outs.

Further, by rotating the flexible hose about its axis, a fresh area will be exposed to the abrading and scouring of the granular material traversing the hose bends. Accordingly, not only has my invention provided improved efficiency of unloading, by reason that virtually every point on a barge is now accessible to the suction nozzle, but the life of the comparatively expensive flexible hose has been significantly extended along with reduced maintenance.

This invention has been described in terms of a pneumatic conveying apparatus with emphasis on unloading grain from barges therewith. Obviously, other granular materials, and cargo carriers may be equally well served by the concepts of my invention and further, it may be applied to a pressure pneumatic conveying apparatus providing similar benefits and advantages as with a vacuum system.

I claim as my invention:

1. A pneumatic unloading apparatus for granular material comprising:
    a material receiving compartment having a common air and material inlet and having separate air and material outlets;
    a flexible hose means having a first end connected to said common air and material inlet and having a second end in operable communication with a lading of granular material;
    means for inducing a suitable air flow into said flexible hose means second end through said hose and into said compartment, whereby granular material is drawn into the hose and conveyed to the material receiving compartment by the air flow;
    separating means within said compartment to separate the granular material from the air flow;
    a telescoping extensible support means for said flexible hose means arranged to support varying lengths thereof adjacent said first end in a generally horizontal position and with varying lengths of said hose means adjacent said second end depending vertically downward from a free end of said extensible support means, about a supported bend, and terminating in said second end; said hose means supported atop said support means; and
    means to extend and retract said extensible support means to position said hose second end in a desired conveying position varying lengths of the flexible hose being supported and said bend changing its location along said flexible hose means as a function of the extension and retraction of the support means.

2. The apparatus of claim 1 wherein said separating means comprises an air filtration system and a granular material deflector.

3. The apparatus of claim 2 wherein said means for inducing a suitable air flow, exhausts said air flow from said material receiving compartment through said air filtration system and out said air outlet.

4. The apparatus of claim 3 wherein granular material is removed from said material receiving compartment through an air lock.

5. The apparatus of claim 1 wherein said extensible support means comprises an extensible boom having a hose means supporting bend end extensible and retractable, elevatable and swingable to position said flexible hose means second end in said desired conveying position, movement of the extensible support means controlled by a control means.

6. The apparatus of claim 5 wherein said supporting bend end is provided with a guide support means to guide and support said flexible hose means along a suitable radius around said bend.

7. The apparatus of claim 6 wherein said flexible hose is supported along said extensible boom and around said guide support means by a plurality of contoured rollers.

8. The apparatus of claim 7 wherein a retaining means is provided to prevent external forces from dislodging said flexible hose means from its support on said extensible boom.

9. The apparatus of claim 8 wherein said guide support means is yieldingly mounted to said extensible boom whereby lateral external forces will not be readily dislodge the flexible hose means from said guide support means.

10. The apparatus of claim 9 wherein said flexible hose means comprises a reinforced rubber-like suction hose and said second end thereof comprises a suction nozzle.

11. A pneumatic conveyor apparatus for particulate material comprising:
- a flexible hose means having an intake and a discharge end operable with the intake end variously positioned with respect to the discharge end;
- means for inducing an air flow through said flexible hose to convey said particulate material therethrough; and
- an extensible support means generally arranged to horizontally support said flexible hose along varying lengths thereof with an unsupported portion of said hose depending downward from an end of said support means, about a bend, whereby varying the length of the flexible hose means being supported to locate one of said hose ends in a desired conveying position, will concurrently vary the location of the bend in the hose means, said extensible support means comprising an extensible boom wherein the end thereof is extended or retracted and is swung and elevated to locate one of said hose ends in a desired conveying position by a suitable control means and end of extensible boom provided with a guide support means to guide and support said flexible base means at a suitable radius around said bend and said flexible hose means being supported along said extensible boom and around said guide support means by a plurality of contoured rollers.

12. A pneumatic granular material unloading apparatus comprising a fixed length flexible hose having opposed inlet and outlet ends, the outlet end stationarily mounted, a crane device having a telescoping arm, the hose supported on the arm of said crane device, said telescoping arm being extensible towards and away from the outlet end of the hose, said arm being elevatable vertically, said arm being rotatable horizontally, said arm terminating in a free end remote from the outlet arm of the hose in a hose supporting curved bend forming supported assembly, said hose being draped over said bend forming support assembly, the inlet end of said hose freely depending from said bend forming support assembly, said bend forming assembly supporting the hose at differing areas of the hose intermediate the inlet and outlet ends in dependent relationship to the positioning of the free end of the arm with respect to the inlet end, the curved bend forming support assembly including a plurality of spaced apart contoured rollers over which the hose is draped, the rollers having their axes spaced from one another along an arc, the axes being parallel to one another.

* * * * *